United States Patent [19]
Smigelski

[11] Patent Number: 6,029,607
[45] Date of Patent: Feb. 29, 2000

[54] BIRD ARBOR

[76] Inventor: Timothy E. Smigelski, 46 Fair Isle Cir., Chalfont, Pa. 18914

[21] Appl. No.: 09/038,733

[22] Filed: Mar. 11, 1998

[51] Int. Cl.[7] ............................. A01K 31/12; A01G 17/06
[52] U.S. Cl. ............................... 119/428; 119/329; 47/44; 47/70
[58] Field of Search ...................... 119/428, 429, 119/329; 52/86; 47/70, 44, 47; D30/110, 111, 115, 117

[56] References Cited

U.S. PATENT DOCUMENTS

| | | |
|---|---|---|
| D. 66,182 | 12/1924 | George . |
| D. 89,038 | 1/1933 | Gass . |
| D. 106,018 | 9/1937 | Copeman . |
| D. 140,175 | 1/1945 | Hyde ............................................ D31/2 |
| 317,939 | 5/1885 | Halfpenny . |
| 828,751 | 8/1906 | Knudson . |
| 857,213 | 6/1907 | Stevens . |
| 1,010,213 | 11/1911 | Anderson . |
| 1,118,198 | 11/1914 | Hagie . |
| 1,257,796 | 2/1918 | Brooks . |
| 2,876,738 | 3/1959 | Wettendorf ................................ 119/23 |
| 3,130,706 | 4/1964 | Myaida et al. . |
| 4,646,468 | 3/1987 | Erceg ........................................... 47/44 |
| 5,103,768 | 4/1992 | Slowinski ................................ 119/23 |
| 5,353,570 | 10/1994 | Cooper, Jr. . |
| 5,560,314 | 10/1996 | Wessinger ................................ 119/433 |

*Primary Examiner*—Peter M. Poon
*Assistant Examiner*—Yvonne R. Abbott
*Attorney, Agent, or Firm*—Synnestvedt & Lechner LLP

[57] ABSTRACT

A bird arbor having a span member supported above the ground by a pair of vertically oriented support members. The span member and support members comprise a free-standing architectural structure forming a through-way. One or more birdhouse are integrally formed within the span member, which can have a shape, such as an arch, for example.

9 Claims, 5 Drawing Sheets

6,029,607

BIRD ARBOR

BACKGROUND

1. Field of the Invention

This invention relates to birdhouses, and more particularly to a birdhouse for use with a landscape or garden design.

2. Related Art

Birdhouses have been incorporated in various ornamental structures for use in landscape and garden designs. Birdhouses are a common an popular accessory for attracting colorful wild birds t a garden or yard. When appropriate nesting facilities re provided, birds will readily nest and provide pleasure to people observing the birds and their behavior.

Many species of birds prefer to nest high above the ground where predators cannot easily raid the nest for eggs. Therefore, in order to attract birds, traditional birdhouses, such as that shown in U.S. Pat. No. Des. 66,182, are mounted a op a structural support, such as a pole, at a sufficient height at which birds will feel secure enough t nest in the birdhouse. While this is an adequate solution to the problem of mounting the birdhouse at a height where birds will readily nest, it lacks architectural qualities to be incorporated with landscape and garden designs.

A birdhouse that has been incorporated with landscape designs is shown in U.S. Pat. No. 5,103,768. Here, a birdhouse is incorporated in a design resembling the Washington Monument. It is believed that more traditional landscape and garden structures may be desirable.

Accordingly, it is an object of the invention to provide a free-standing landscape structure incorporating one or more birdhouses.

Another object of the invention to provide an aesthetically pleasing means for supporting one or more birdhouses.

It is yet another object of the invention to provide a structure wherein one or more birdhouses are integrally arranged.

These and other objects will become apparent from a consideration of the following drawings and detailed description of preferred embodiments of the invention.

SUMMARY OF THE INVENTION

This invention provides a bird arbor which incorporates one or more birdhouses into a free-standing architectural structure designed to support the birdhouses at a practical height at which birds will readily nest. The structure is intended to be both decorative and functional and thereby meet both the practical requirements for a birdhouse without compromising aesthetic concerns which have not been previously addressed by prior art designs.

The bird arbor according to the invention comprises a span member incorporating at least one birdhouse. The span member can be formed in almost any shape desired as dictated by aesthetics or personal taste. The birdhouse is formed within the span member. An aperture in the span member provides access to the cavity for the bird. The span member is supported above ground by a pair of support members. The support members are arranged under the span spaced from one another and together the span and supports comprise a free-standing structure forming a through-way.

The span can easily incorporate several birdhouses and take on various shapes, the round arch being an example. It is useful to mount a perch on the span member beneath the aperture of each birdhouse to provide birds with a place to alight before entering a birdhouse. It is also convenient to provide an access to each birdhouse allowing the cavity of each birdhouse to be cleaned. The access has a door which can be opened or closed as required to service the birdhouse. It is preferred to construct the bird arbor from wood, such as redwood or cedar which will withstand the elements without the need for painting or other such treatments.

DETAILED DESCRIPTION OF THE PREFERRED EMBODIMENTS

Figure 1:
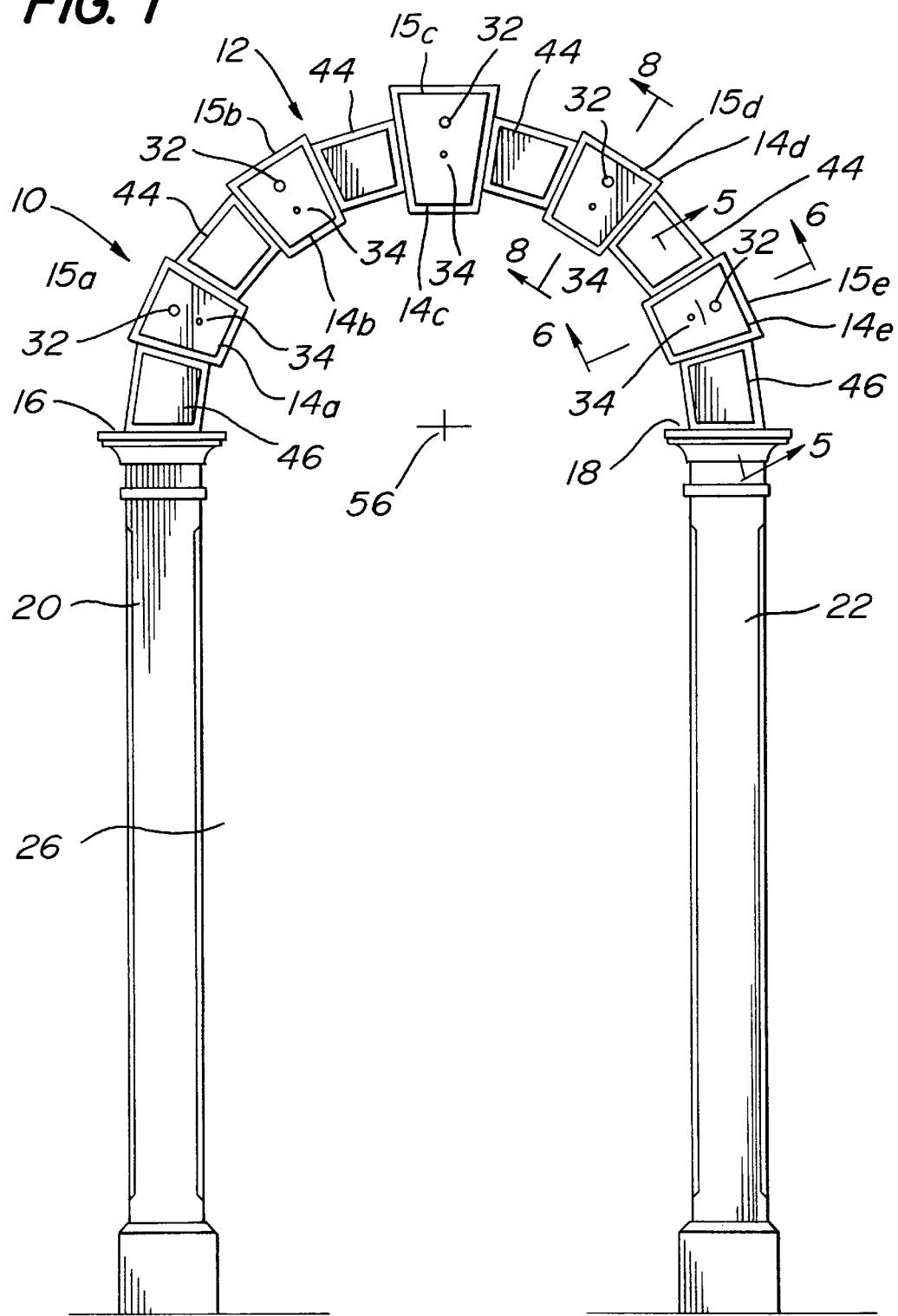
FIG. 1 shows a front elevational view of a bird arbor according to the invention.
Figure 2:
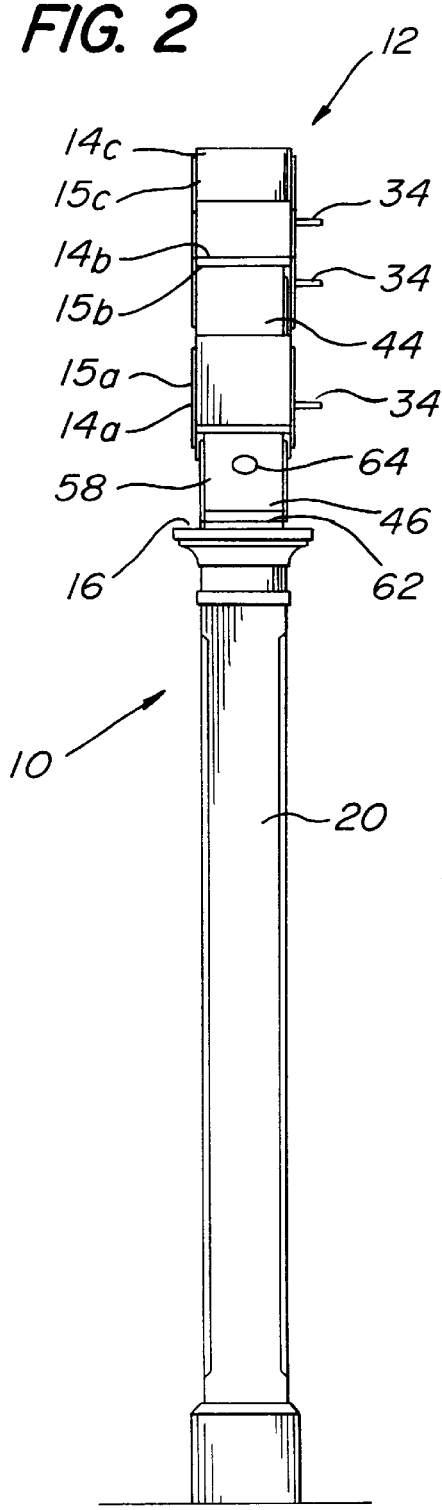
FIG. 2 shows a side elevational view of the bird arbor of FIG. 1.
Figure 3:
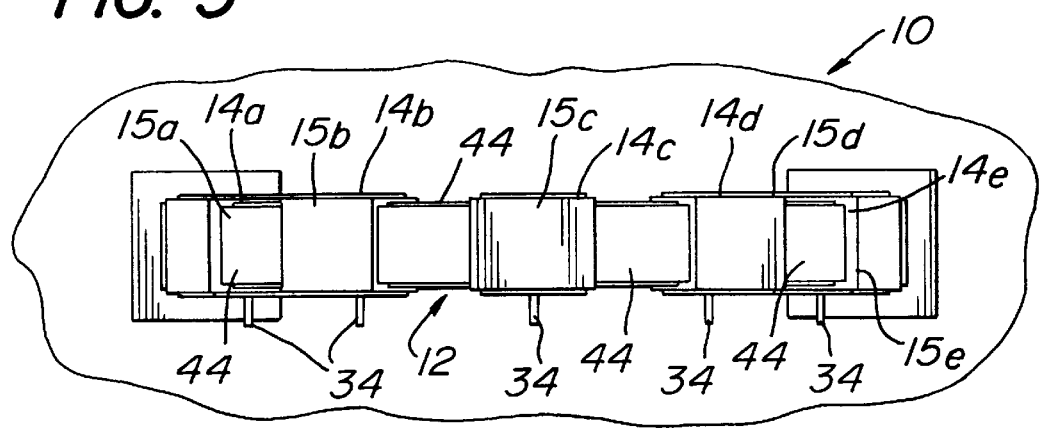
FIG. 3 shows a top view of the bird arbor of FIG. 1.

A bird arbor 10 according to the invention is depicted in FIGS. 1–3 and comprises an elongated span member 12 incorporating at least one, but preferably a plurality of bird houses 14a–14e. Although span member 12 could assume almost any shape, a round arch is shown as an example. Span member 12 has two ends 16 and 18 which are horizontally separated and mounted atop a pair of support members 20 and 22 spaced from one another as shown. The support members 20 and 22 are substantially vertically oriented and formed as rectangular columns in the illustrated embodiment. Together, span member 12 and support members 20 and 22 form a through-way 26 defined along its top by the span member 12, and along its sides by the spaced support members 20, 22.

Figure 5:
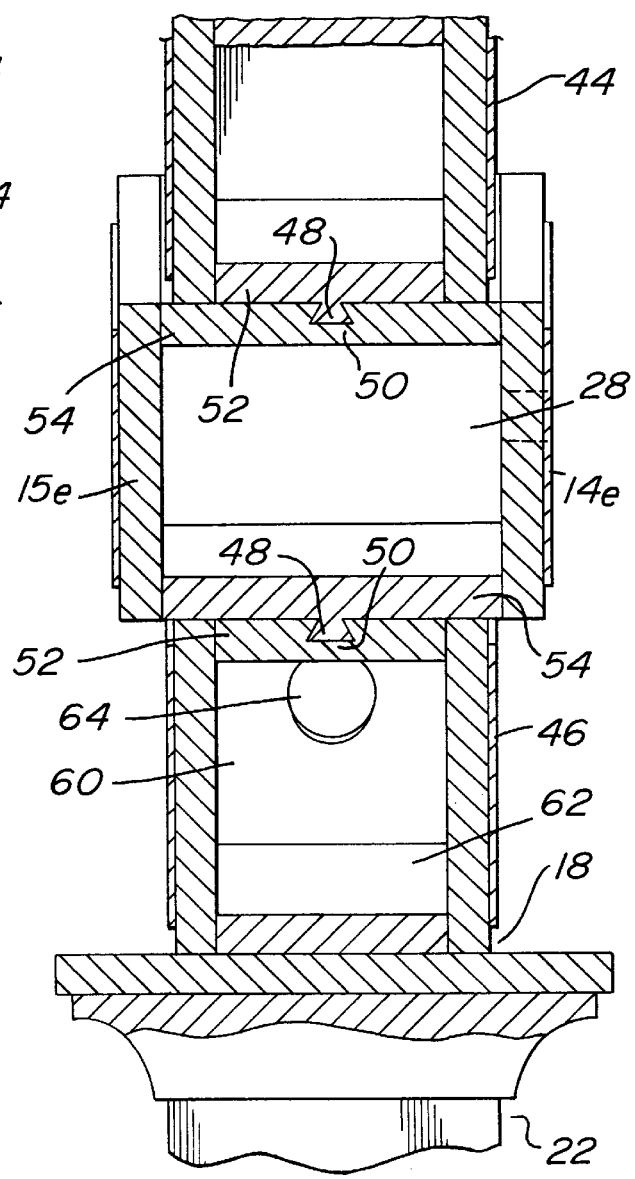
FIG. 5 shows a sectional view of the bird arbor taken along line 5—5 of FIG. 1.
Figure 6:
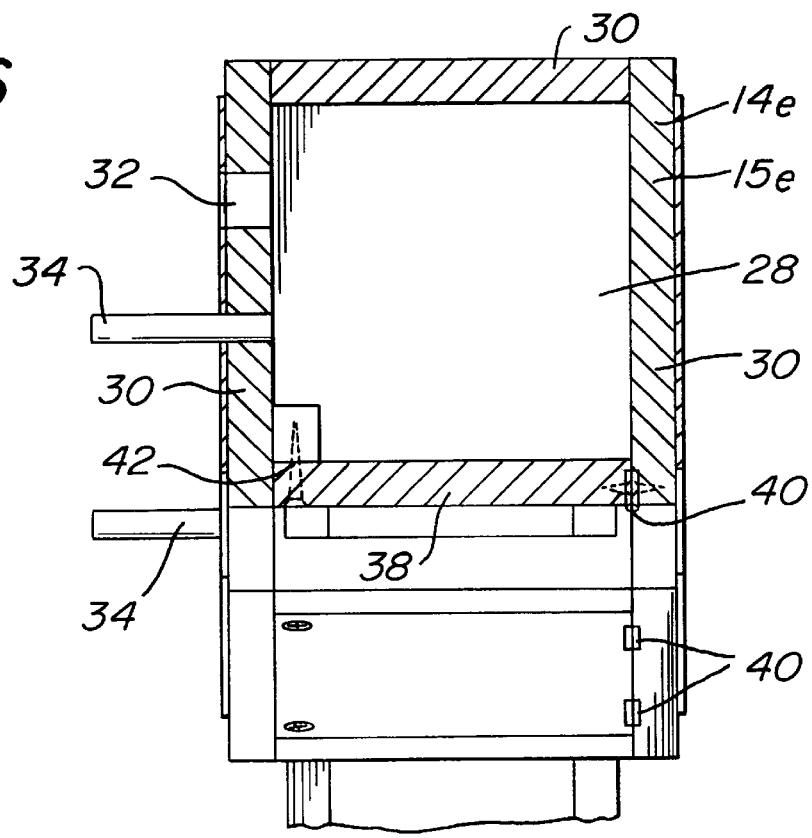
FIG. 6 shows a cross sectional view of the bird arbor taken along line 6—6 of FIG. 1.

Birdhouses 14a–14e are described in detail with reference to FIGS. 4–8. As all of the birdhouses are substantially similar, it is understood that the following description of birdhouses 14d or 14e applies to all of the birdhouses. Birdhouse 14e preferably comprises an individual block 15e within which a cavity 28 is disposed as seen in FIG. 6. Walls 30 enclose and define the cavity 28 wherein the birds nest. The walls 30 are attached to one another by means well known in the art, such as adhesives, nails or screw fasteners (not shown). Access to cavity 28 is provided by aperture 32 which has a perch 34 projecting from span member 12 and positioned beneath the aperture 32. Birds alight on perch 34 and then enter cavity 28 through aperture 32.

Figure 8:
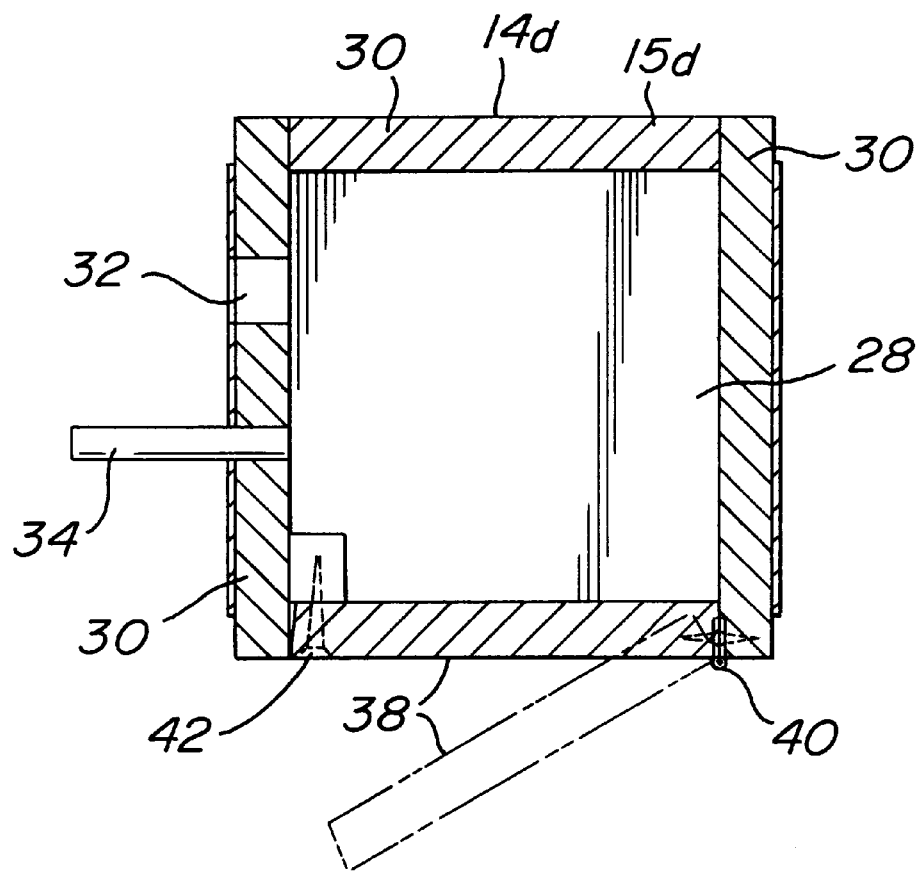
FIG. 8 shows a cross sectional view of the bird arbor taken along lines 8—8 in FIG. 1.

Means for cleaning the cavity 28 are provided. This is conveniently accomplished by an access panel 38 which, in the preferred embodiment, comprises one of the walls 30 of the birdhouse as seen in FIGS. 6 and 8. The access panel 38 is movable via hinge 40, and, when opened as shown in phantom line in FIG. 8, allows the easy removal of debris and accumulated nesting material. The access panel 38 is secured to the birdhouse by means of screw 42 which can be used repeatedly to secure or release door 38.

Figure 7:
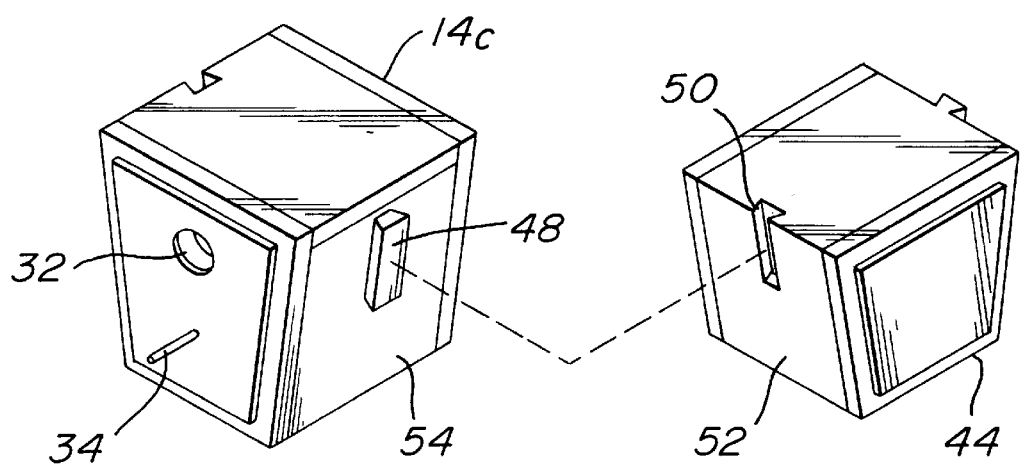
FIG. 7 shows a detailed view of two components comprising the bird arbor according to the invention.

Preferably, span member 12 is comprised of a plurality of individual blocks 15a–15e comprising the birdhouses along with intermediate blocks 44 and terminal blocks 46 all illustrated in FIGS. 1–4 and 7. The blocks 44 and 15a–15e are arranged adjacent each other to form the span member 12, with blocks 15a–15e being arranged in an alternating pattern with intermediate blocks 44. Terminal blocks 46 occupy positions at the ends of span 12 and form the interface between the span and support members 20, 22. The blocks are attached to one another preferably by means of a sliding dovetail joint comprising a tenon 48 extending from a block as seen in FIG. 7 which engages a mating mortise 50 in an adjacent block. As seen in FIG. 5, the sliding dovetail joint provides an effective means for interlocking birdhouses 14a–14e with neighboring intermediate blocks 44 or terminal blocks 46.

As seen in FIG. 7, the interfacing sides 52 and 54 of blocks comprising span 12 are oriented at an angle relative to the opposite interfacing side on the respective block. The angles are determined so that when the blocks are attached one to another to form a circular arch as seen in FIG. 1, interfacing sides 52 and 54 on each block align with a common center of convergence 56 within through-way 26 (see FIG. 1).

Figure 4:
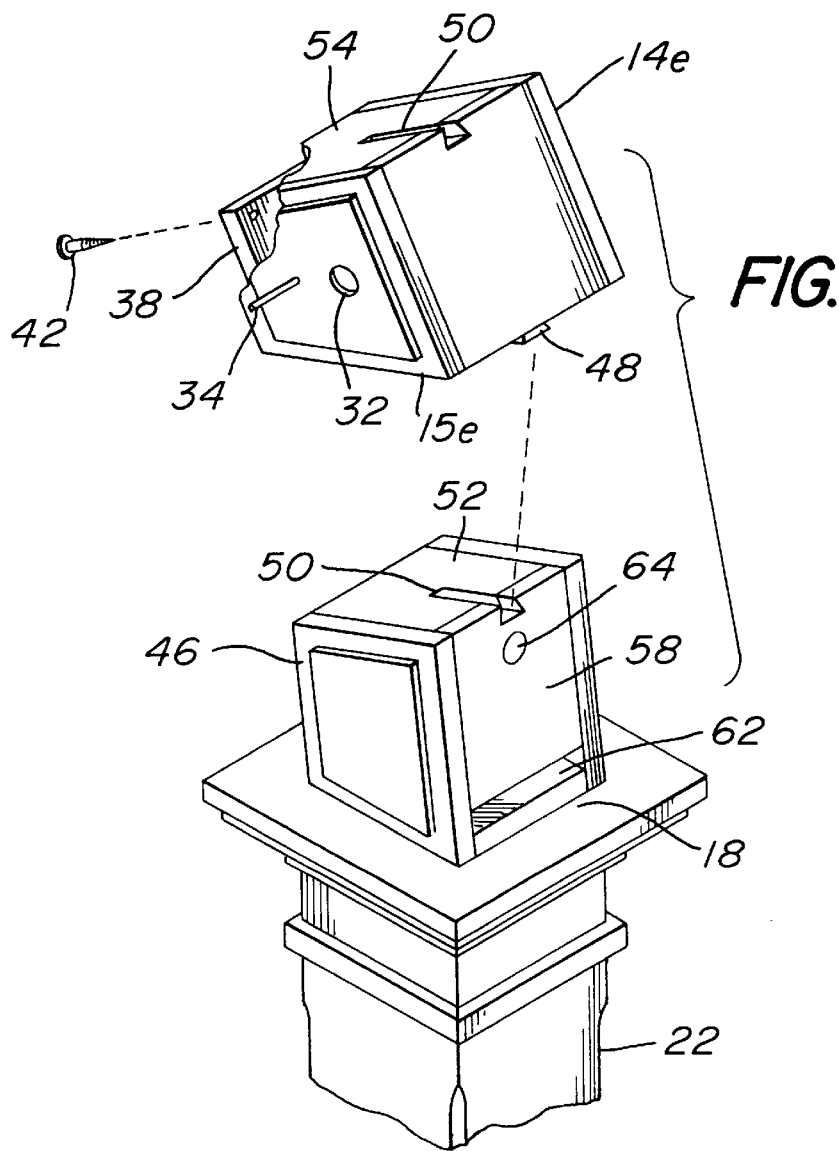
FIG. 4 shows an exploded view of a portion of the bird arbor according to the invention.

As seen in FIGS. 2, 4 and 5, terminal blocks 46 house a birdfeeder 58. Birdfeeder 58 comprises a container 60 formed within block 46 for storing seeds and the like preferred by birds. A slot 62 disposed in the lower portion of block 46 and communicating with cavity 60 is positioned to dispense the seed stored therein. A fill aperture 64 is provided in the upper portion of block 46 to allow cavity 60 to be replenished with seed.

The bird arbor according to the invention provides an aesthetic architectural structure incorporating a birdhouse and which—rather than a mere structural expedient—provides an aesthetic enhancement to a landscape or garden design.

It is understood that the foregoing description is intended to describe certain embodiments of the present invention and is not intended to limit it in any way. This invention is to be read as limited by the claims only.

What is claimed is:

1. A bird arbor, comprising:

an elongated span member having an arcuate shape and two ends displaced horizontally from each other;

at least one birdhouse comprising an enclosed cavity disposed within said span, and a first aperture through a portion of said span overlying said cavity to provide ingress to and egress from said cavity; and a pair of support members for supporting said span, one support member of said pair being disposed beneath each of said two ends.

2. A bird arbor according to claim 1, wherein said support members are oriented substantially vertically.

3. A bird arbor according to claim 1, wherein said bird arbor comprises wood.

4. A bird arbor according to claim 1, wherein said bird house further comprises an access panel positioned in overlying relationship with said cavity movably mounted onto said span, said access panel being movable to allow access to said cavity.

5. A bird arbor according to claim 1, wherein said arcuate shape comprises a round arch.

6. A bird arbor according to claim 5, wherein said span comprises a plurality of blocks, each block having two oppositely disposed sides arranged at an acute angle relative to each other, each block being attached to an other of said blocks, each of said blocks being oriented with said sides aligned with a common center of convergence, thereby forming said round arch.

7. A bird arbor according to claim 6, wherein at least one block is attached to another block by a sliding dovetail joint comprising a tenon extending from one of said sides on at least one block and a mortise disposed in another of said sides on an adjacent block, said tenon interengaging said mortise and thereby attaching said one block to said adjacent block.

8. A bird arbor according to claim 6, wherein said plurality of blocks comprises a first set of blocks, each block thereof comprising a birdhouse, and a second set of blocks, each block from said first set being arranged adjacent to a block from said second set.

9. A bird arbor according to claim 8, wherein at least one block from said second set comprises a bird feeder comprising a container for storing birdfood, said container having an opening for dispensing the birdfood.

\* \* \* \* \*